United States Patent [19]

Johnson

[11] Patent Number: 4,968,049
[45] Date of Patent: Nov. 6, 1990

[54] MATTRESS MOVING APPARATUS

[76] Inventor: Michael E. Johnson, 20016 Wayne St., Torrance, Calif. 90503

[21] Appl. No.: 413,206

[22] Filed: Sep. 27, 1989

[51] Int. Cl.⁵ .................................................. B62B 1/24
[52] U.S. Cl. .............................. 280/47.24; 280/47.131; 294/15; 294/151; 294/169
[58] Field of Search .................. 294/15, 149, 151, 152, 294/153, 167, 169, 32; 280/659, 47.131, 47.17, 47.18, 47.19, 47.24, 47.371

[56] References Cited

U.S. PATENT DOCUMENTS

| | | |
|---|---|---|
| 2,399,786 | 5/1946 | Caton . |
| 2,521,819 | 9/1950 | Baer ........................... 280/47.131 X |
| 3,007,710 | 11/1961 | Sykes ............................. 280/659 X |
| 4,119,250 | 10/1928 | Brutlag . |
| 4,431,226 | 2/1984 | Weilert . |
| 4,521,045 | 6/1985 | Hart . |
| 4,553,780 | 11/1985 | Strachan . |
| 4,759,559 | 7/1988 | Moulton ....................... 280/47.18 X |

FOREIGN PATENT DOCUMENTS 1581782  9/1969  France ............................. 280/47.17

Primary Examiner—Margaret A. Focarino
Assistant Examiner—Dean Kramer
Attorney, Agent, or Firm—Leon Gilden

[57] ABSTRACT

A mattress moving arrangement includes a plurality of legs configured in "A" shaped orientation formed with an orthogonal extending handle relative to the intersection defined by the aforenoted legs. The lowermost portion of the legs include "L" shaped members for receiving a mattress therewithin. Modifications of the invention include castor wheels revolvably mounted and extending downwardly from the "L" shaped legs, and additionally may include strap members joined together at a ring portion originating from each of the "L" shaped members for surrounding relationship relative to a mattress cradled within the invention, and wherein the ring is positionable about the upper handle for securement of the mattress within the device. Further, a second handle may be pivotally mounted relative to a cross brace member directed between the legs.

1 Claim, 4 Drawing Sheets

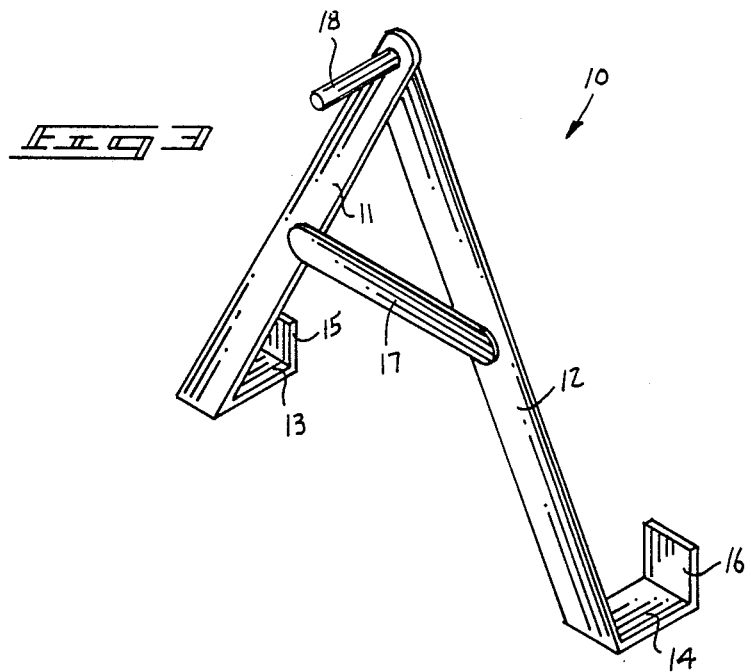
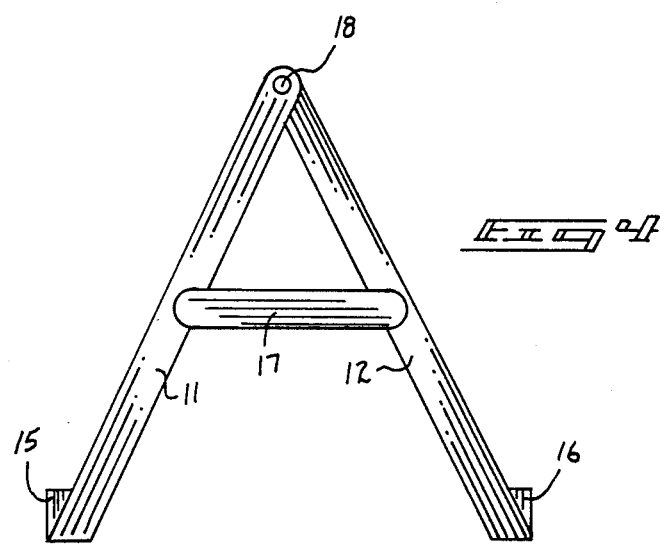

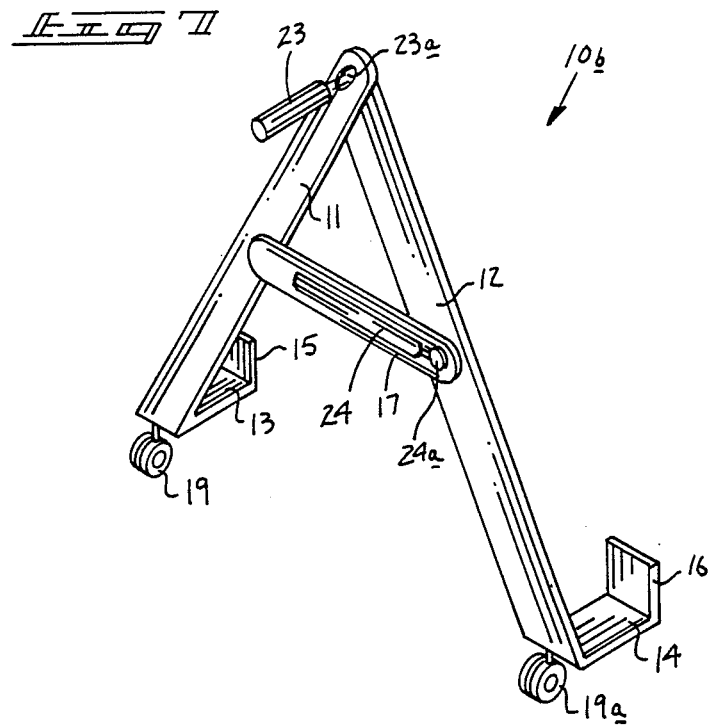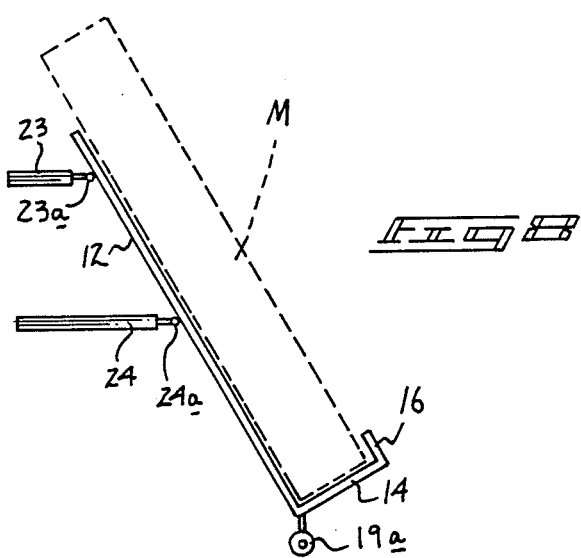

MATTRESS MOVING APPARATUS

BACKGROUND OF THE INVENTION

1. Field of the Invention

The field of invention relates to mattress moving devices, and more particularly pertains to a new and improved mattress moving apparatus wherein the same is readily and securely securable to a mattress to enhance a single individual to transport the workpiece.

2. Description of the Prior Art

Mattress moving devices have been set forth in the prior art. The prior art devices have heretofore been of various constructions to receive a mattress therewithin, wherein the instant invention attempts to overcome deficiencies of the prior art that include organizations less efficient in their configuration and use, as opposed to that of the instant invention. For example, the prior art includes U.S. Pat. No. 2,399,786 to Caton setting forth a rectangular framework provided with a generally "Y" shaped strap configuration for overlying an associated mattress secured within the framework enabling manual securement of a free end of the "Y" shaped strap for transport of the organization in use.

U.S. Pat. No. 4,119,250 sets forth a rectangular pocket arrangement provided with straps relative to each end thereof to enable transport of a mattress interiorly of the pocket by a plurality of individuals positioned for use of each strap.

U.S. Pat. No. 4,521,045 to Hart sets forth a mattress carrier device providing a grid work of strap members to receive a mattress therewithin, as the strap members are secured to a zippered pocket for receiving the mattress to facilitate transport of the same.

U.S. Pat. No. 4,553,780 to Strachan sets forth a mattress carrying apparatus set forth as a harness provided with a plurality of belts and a harness arrangement about the mattress lying on opposite sides of the mattress and adjustable to enable the harness to be tightened about the mattress in use.

U.S. Pat. No. 4,431,226 to Weilert sets forth a mattress transport device utilizing a two-person carrying strap arrangement positioned at spaced relationships relative to one another overlying a mattress to enable a plurality of individuals to transport the mattress in use.

As such, it may be appreciated that there is a continuing need for a new and improved mattress moving apparatus which addresses both the problems of ease of use and effectiveness in construction, and to this extent, the present invention substantially fulfills this need.

SUMMARY OF THE INVENTION

In view of the foregoing disadvantages inherent in the known types of mattress moving devices now present in the prior art, the present invention provides a mattress moving apparatus wherein the same is arranged for submitting and centering a mattress relative to a framework to enable transport by an individual. As such, the general purpose of the present invention, which will be described subsequently in greater detail, is to provide a new and improved mattress moving apparatus which has all the advantages of the prior art mattress moving devices and none of the disadvantages.

To attain this, the present invention includes an "A" frame arrangement defined by a plurality of legs formed of an upwardly oriented intersection with a handle orthogonally directed outwardly relative to the intersection of the two legs. The legs each include "L" shaped leg members extending orthogonally relative to lower ends of the aforenoted legs in an orientation opposite to that defined by the handle. Modifications include castor members revolvably mounted at each bottom surface of the "L" shaped legs, and further include strap members mounted to each of the "L" shaped legs terminating in a rigid ring for securement overlying the handle when adjustably tightened about an included mattress for transport. A further modification includes a second handle pivotally mounted relative to the framework overlying a brace secured between the plurality of legs.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved mattress moving apparatus which has all the advantages of the prior art mattress moving devices and none of the disadvantages.

It is another object of the present invention to provide a new and improved mattress moving apparatus which may be easily and efficiently manufactured and marketed.

It is a further object of the present invention to provide a new and improved mattress moving apparatus which is of a durable and reliable construction.

An even further object of the present invention is to provide a new and improved mattress moving apparatus which is susceptible of a low cost of manufacture with regard to both materials and labor, and which accordingly is then susceptible of low prices of sale to the consuming public, thereby making such mattress moving apparatus economically available to the buying public.

Still yet another object of the present invention is to provide a new and improved mattress moving apparatus which provides in the apparatuses and methods of the prior art some of the advantages thereof, while simultaneously overcoming some of the disadvantages normally associated therewith.

Still another object of the present invention is to provide a new and improved mattress moving apparatus arranged for aligning and centering a mattress for transport by an individual.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of the instant invention.

FIG. 4 is an orthographic view taken in elevation of the instant invention, as illustrated in FIG. 3.

FIG. 7 is an isometric illustration of a further modification of the mattress moving apparatus of the instant invention.

FIG. 8 is an orthographic side view taken in elevation of the mattress moving apparatus, as illustrated in FIG. 7, oriented for transport of an included mattress thereon.

DESCRIPTION OF THE PREFERRED EMBODIMENT

Figure 1:
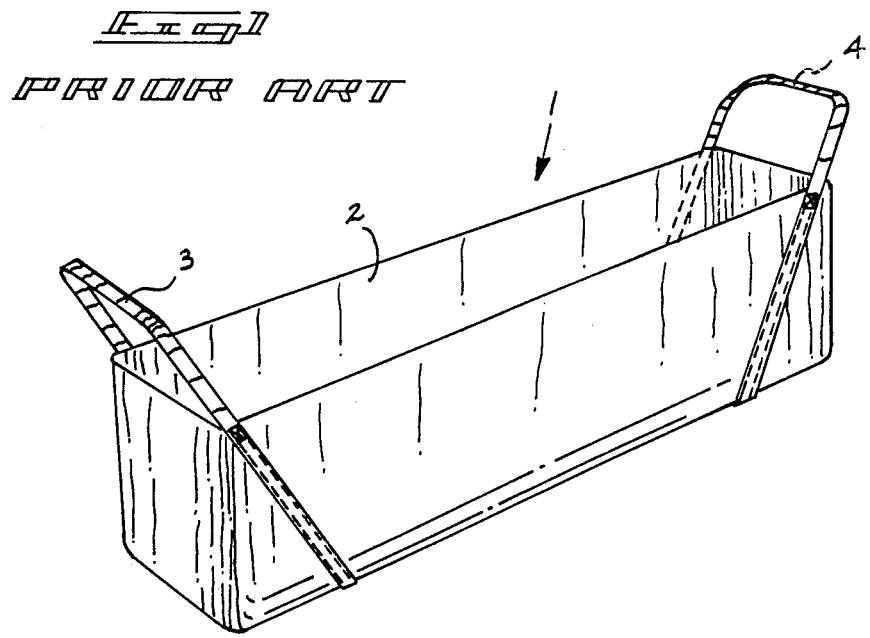
FIG. 1 is an isometric illustration of a prior art mattress moving apparatus.

With reference now to the drawings, and in particular to FIGS. 1 to 8 thereof, a new and improved mattress moving apparatus embodying the principles and concepts of the present invention and generally designated by the reference numeral 10 will be described.

Figure 2:
FIG. 2 is an isometric illustration of a further prior art mattress moving apparatus.

More specifically, the mattress moving apparatus of the instant invention essentially comprises an improvement over the prior art devices, as is exemplified in FIGS. 1 and 2. FIG. 1 is illustrative of a first mattress moving apparatus 1 utilizing a rectangular pocket formed with handles 3 and 4 secured diagonally relative to each end of the pocket for reception of a mattress therewithin for transport by a plurality of individuals. FIG. 2 illustrates a further mattress moving device 5 formed with a rectangular framework 6 of a generally "L" shaped configuration to receive a mattress thereon with a strap directed from opposed corners of the framework to overlie an associated mattress for manual grasping by an individual for transport of the mattress.

FIG. 3 illustrates the mattress moving apparatus 10 including a first leg 11 and a second leg 12 joined at the upper terminal ends at an intersection defining an acute angle therebetween. Each lower terminal ends of the respective first and second legs includes a third leg 13 and a fourth leg 14 extending orthogonally outwardly relative to the first and second legs, with a respective fifth and sixth leg 15 and 16 orthogonally mounted and extending upwardly relative to the respective third and fourth legs 13 and 14. The leg pairs 13, 15, and 14, 16 define a cradle to receive a mattress on an upper surface of the respective legs 13 and 14 and within interior surfaces of the fifth and sixth legs 15 and 16 to secure and position a mattress therebetween and for support against the vertical surfaces of the first and second legs 11 and 12. A cross brace 17 rigidly mounts the first and second legs 11 and 12 together on a second surface of the first and second legs 11 and 12 opposed to that defined by the first surface for receiving a mattress thereon. The brace necessary for geometric integrity of the organization is positioned on the exterior surface of the first and second legs 11 and 12 to avoid abrasive contact with the mattress positioned upon the device. A rigid handle member 18 is integrally mounted at the apex of the joinder of the first and second legs 11 and 12 for manual grasping by an individual for transport of a mattress secured upon the device.

Figure 5:
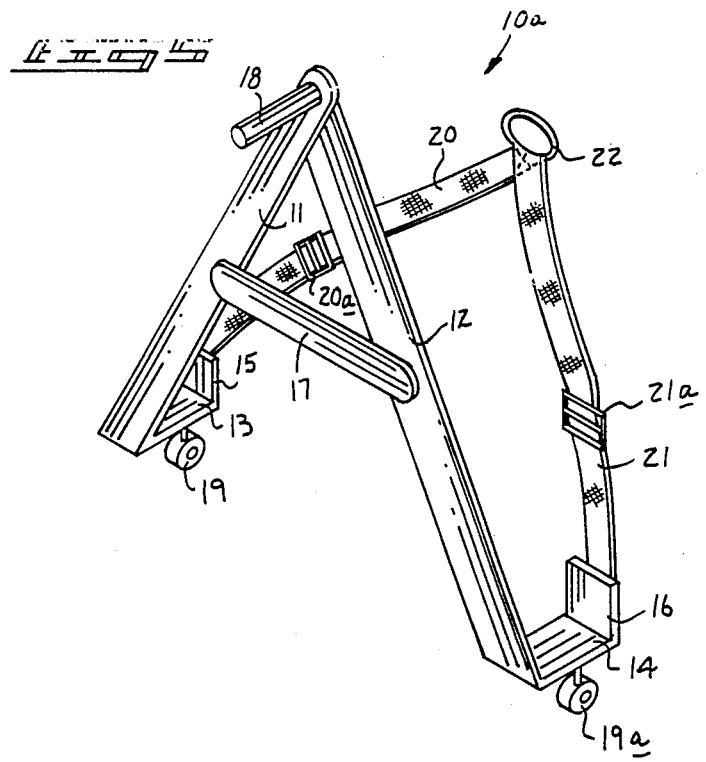
FIG. 5 is an isometric illustration of a modification of the mattress moving apparatus of the instant invention.
Figure 6:
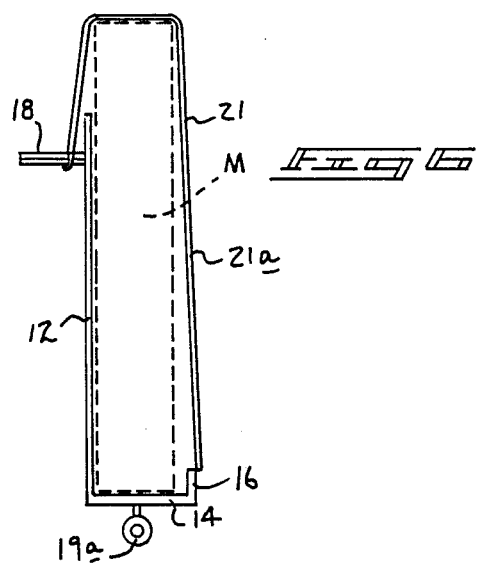
FIG. 6 is an orthographic side view, taken in elevation of the mattress moving apparatus as illustrated in FIG. 5.

FIGS. 5 and 6 illustrate a modification of the instant invention 10a wherein first and second castor wheels 19 and 19a are rotatably and orthogonally mounted relative to lower surfaces of the third and fourth legs 13 and 14 respectively to enable surface transport of a mattress positioned upon the device. A first fabric strap 20 is secured to an exterior surface of the fifth leg 15, while a second fabric strap 21 is secured to an exterior surface of the sixth leg 16, and wherein the first and second fabric straps 20 and 21 merge and are secured together at an apex remote from the fifth and sixth legs 15 and 16 with rigid "O" ring 22 mounted at the joinder apex of the first and second fabric straps 20 and 21. The rigid ring 22 is positioned for receiving a mattress upon the third and fourth legs 13 and 14 and subsequently enabling the straps 20 and 21 to overlie the mattress "M" and be secured about the handle 18.

FIGS. 7 and 8 illustrate a further modification of the mattress moving apparatus 10b wherein the "A" shaped framework includes a first pivotally mounted handle 23, including a first handle pivot 23a positioned at the apex of the joinder of the first and second legs 11 and 12. The cross brace 17 includes a second pivotally mounted handle 24 mounted thereon by use of a second handle pivot 24a to enable enhanced two-handed transport of the apparatus by an individual upon positioning of a mattress "M" thereon. The first and second castor wheels 19 and 19a are in the further modification 10b positioned at the intersection of the first and second legs 11 and 12 and the first and second castor wheels 19 and 19a, wherein the first and second castor wheels 19 and 19a include their shafts mounted at forty-five degree angles relative to joinder intersecting line of exterior surfaces of the respective first and second legs 11 and 12 and the third and fourth legs 13 and 14, as illustrated in FIG. 8. A second castor wheel (not illustrated) may be positioned forwardly of the respective castor wheels 19 and 19a underlying the legs 13 and 14 respectively.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A mattress moving apparatus comprising,
 a first rigid planar leg including a first upper end and a first lower end, and
 a second rigid planar leg including a second upper end and a second lower end, and
 the first upper end and the second upper end secured together to define an acute angle between the first leg and the second leg, and
 a first "L" shaped support member orthogonally secured to the first lower end and a second "L" shaped support member secured to the second lower end wherein a mattress is positionable between the first and second "L" shaped members and the first and second legs during transport, and
 a rigid handle integrally secured and directed orthogonally outwardly relative to the first and second upper ends, and
 wherein the handle is directed in a first direction relative to the first and second legs and the first and second "L" shaped members are oriented in a second direction relative to the first and second upper legs opposed to that of the first direction, and
 including a brace member mounted between the handle and the first and second "L" shaped members onto the first and second legs and extending relative to the first and second legs in the first direction, and
 further including a first castor revolvably mounted to a bottom surface of the first "L" shaped member and oriented orthogonally relative to the first "L" shaped member, and a second castor revolvably mounted to a bottom surface of the second "L" shaped member and orthogonally mounted relative to the second "L" shaped member, and
 including a first flexible strap secured to a first vertical leg of the first "L" shaped member and a second flexible strap secured to a second vertical leg of the second "L" shaped member, and the first and second flexible straps secured together at their upper ends, and a rigid ring secured to the upper ends of the first and second flexible straps, and
 wherein the ring is defined by an interior opening greater than that of the handle to receive the handle therewithin, and
 wherein the first flexible strap and the second flexible strap each respectively include a first adjustment buckle and a second adjustment buckle thereon to permit lengthwise adjustments of the first and second flexible straps respectively to tightly secure the first and second flexible straps about a mattress when the ring is mounted to receive the handle therethrough, and
 including a first castor rigidly mounted to a first intersection defined by the first leg and the first "L" shaped member joined together, and a second castor revolvably mounted to a second intersection defined by the second leg and the second "L" shaped member secured together, and the handle includes a pivot mount pivotally mounting a handle extension relative to the pivot mount, and further including a further handle including a further pivot mount wherein the further pivot mount is integrally secured to the brace member.

* * * * *